US012143879B2

(12) United States Patent
Sabouri-Sichani et al.

(10) Patent No.: US 12,143,879 B2
(45) Date of Patent: Nov. 12, 2024

(54) APPARATUS, METHOD AND COMPUTER PROGRAM

(71) Applicant: Nokia Technologies Oy, Espoo (FI)

(72) Inventors: Faranaz Sabouri-Sichani, Aalborg (DK); Daniela Laselva, Klarup (DK); Frank Frederiksen, Klarup (DK)

(*) Notice: Subject to any disclaimer, the term of this patent is extended or adjusted under 35 U.S.C. 154(b) by 303 days.

(21) Appl. No.: 17/442,439

(22) PCT Filed: Mar. 28, 2019

(86) PCT No.: PCT/EP2019/057955
§ 371 (c)(1),
(2) Date: Sep. 23, 2021

(87) PCT Pub. No.: WO2020/192939
PCT Pub. Date: Oct. 1, 2020

(65) Prior Publication Data
US 2022/0167230 A1    May 26, 2022

(51) Int. Cl.
*H04W 36/00* (2009.01)
*H04W 24/10* (2009.01)
(Continued)

(52) U.S. Cl.
CPC ....... *H04W 36/0085* (2018.08); *H04W 24/10* (2013.01); *H04W 36/305* (2018.08); *H04W 52/0241* (2013.01); *H04W 36/00837* (2018.08)

(58) Field of Classification Search
CPC ............. H04W 36/0085; H04W 24/10; H04W 36/00837; H04W 36/305; H04W 52/0241;
(Continued)

(56) References Cited

U.S. PATENT DOCUMENTS

2015/0189560 A1    7/2015   Ji
2016/0285679 A1    9/2016   Dudda et al.
(Continued)

FOREIGN PATENT DOCUMENTS

CN    103797849 A    5/2014
CN    104205918 A    12/2014
(Continued)

OTHER PUBLICATIONS

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.
(Continued)

*Primary Examiner* — Ashley Shivers
(74) *Attorney, Agent, or Firm* — Lippes Mathias LLP (57) ABSTRACT

There is provided an apparatus, said apparatus comprising means for operating using a first measurement configuration, determining that a first trigger condition related to at least a radio link failure indicator is met and in response to the determining, operating using a second measurement configuration until a second trigger condition is met, wherein operating using the second measurement configuration comprises at least one of performing measurements with a decreased periodicity, an increased number of samples and/or an increased number of reports, increasing the number of measured neighbour cells and reducing a time to trigger handover period relative to the first measurement configuration.

9 Claims, 9 Drawing Sheets

(51) Int. Cl.
*H04W 36/30* (2009.01)
*H04W 52/02* (2009.01)

(58) Field of Classification Search
CPC ..... H04W 24/02; Y02D 30/70; H04L 1/0027; H04L 1/0026
See application file for complete search history.

(56) References Cited

U.S. PATENT DOCUMENTS

| | | | |
|---|---|---|---|
| 2017/0026861 A1 | 1/2017 | Tseng et al. | |
| 2019/0053109 A1 | 2/2019 | Tambaram Kailasam et al. | |
| 2019/0313314 A1* | 10/2019 | Yang | H04W 24/08 |
| 2019/0320361 A1* | 10/2019 | Uchiyama | H04W 40/36 |
| 2022/0078873 A1* | 3/2022 | Belleschi | H04W 28/24 |

FOREIGN PATENT DOCUMENTS

| | | |
|---|---|---|
| CN | 107210826 A | 9/2017 |
| JP | 2016052126 A | 4/2016 |

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.4.0, Dec. 2018, pp. 1-97.

"New SID: Study on UE Power Saving in NR", 3GPP TSG RAN Meetings #80, RP-181463, Agenda:9.1.8, CATT, Jun. 11-14, 2018, 5 pages.

"3rd Generation Partnership Project; Technical Specification Group Radio Access Network; NR; Study on UE Power Saving (Release 16)", 3GPP TR 38.840, V0.1.0, Nov. 2018, pp. 1-24.

International Search Report and Written Opinion received for corresponding Patent Cooperation Treaty Application No. PCT/EP2019/057955, dated Dec. 11, 2019, 13 pages.

Office Action received for corresponding Indian Patent Application No. 202147048564, dated Mar. 28, 2022, 6 pages.

Office action received for corresponding Chinese Patent Application No. 201980094752.X, dated Feb. 29, 2024, 10 pages of office action and no page of translation available.

\* cited by examiner

APPARATUS, METHOD AND COMPUTER PROGRAM

RELATED APPLICATION

This application was originally filed as PCT Application No. PCT/EP2019/057955, filed on Mar. 28, 2019, of which is incorporated herein by reference in its entirety.

FIELD

The present application relates to a method, apparatus, system and computer program and in particular but not exclusively to error prediction and measurement recovery.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus comprising means for operating using a first measurement configuration, determining that a first trigger condition related to at least a radio link failure indicator is met and in response to the determining, operating using a second measurement configuration until a second trigger condition is met, wherein operating using the second measurement configuration comprises at least one of performing measurements with a decreased periodicity, an increased number of samples and/or an increased number of reports, increasing the number of measured neighbour cells and reducing a time to trigger handover period relative to the first measurement configuration.

The first measurement configuration may be a power saving measurement configuration.

The first measurement configuration and the second measurement configuration may comprise a radio resource management measurement and reporting configuration.

The radio link failure indicator may comprise at least one of a radio link failure counter, a radio link timer, determining that reference signal received power is below a first threshold, determining the failure of decoding a physical downlink control channel or physical downlink shared channel, performing new cell discovery and determining the disappearance of a known cell.

The apparatus may comprise means for operating using the second measurement configuration after a first counter value is met or after expiry of a timer following determining that the first trigger condition is met The second trigger condition may comprise at least one of reset of a radio link failure timer, radio link failure and use of a first amount of resources.

The apparatus may comprise means for performing synchronisation attempts while the apparatus is operating using the second measurement configuration.

The apparatus may comprise means for operating using the first measurement configuration or a third measurement configuration after the second trigger condition is met.

In a second aspect there is provided a method comprising operating using a first measurement configuration, determining that a first trigger condition related to at least a radio link failure indicator is met and in response to the determining, operating using a second measurement configuration until a second trigger condition is met, wherein operating using the second measurement configuration comprises at least one of performing measurements with a decreased periodicity, an increased number of samples and/or an increased number of reports, increasing the number of measured neighbour cells and reducing a time to trigger handover period relative to the first measurement configuration.

The first measurement configuration may be a power saving measurement configuration.

The first measurement configuration and the second measurement configuration may comprise a radio resource management measurement and reporting configuration.

The radio link failure indicator may comprise at least one of a radio link failure counter, a radio link timer, determining that reference signal received power is below a first threshold, determining the failure of decoding a physical downlink control channel or physical downlink shared channel, performing new cell discovery and determining the disappearance of a known cell.

The method may comprise operating using the second measurement configuration after a first counter value is met or after expiry of a timer following determining that the first trigger condition is met.

The second trigger condition may comprise at least one of reset of a radio link failure timer, radio link failure and use of a first amount of resources.

The method may comprise performing synchronisation attempts while the apparatus is operating using the second measurement configuration.

The method may comprise operating using the first measurement configuration or a third measurement configuration after the second trigger condition is met.

In a third aspect there is provided an apparatus comprising at least one processor and at least one memory including a computer program code, the at least one memory and computer program code configured to, with the at least one processor, cause the apparatus at least to: operate using a first measurement configuration, determine that a first trigger condition related to at least a radio link failure indicator is met and in response to the determining, operate using a second measurement configuration until a second trigger condition is met, wherein operating using the second measurement configuration comprises at least one of performing measurements with a decreased periodicity, an increased number of samples and/or an increased number of reports, increasing the number of measured neighbour cells and reducing a time to trigger handover period relative to the first measurement configuration.

The first measurement configuration may be a power saving measurement configuration.

The first measurement configuration and the second measurement configuration may comprise a radio resource management measurement and reporting configuration.

The radio link failure indicator may comprise at least one of a radio link failure counter, a radio link timer, determining that reference signal received power is below a first threshold, determining the failure of decoding a physical downlink control channel or physical downlink shared channel, performing new cell discovery and determining the disappearance of a known cell.

The apparatus may be configured to operate using the second measurement configuration after a first counter value is met or after expiry of a timer following determining that the first trigger condition is met.

The second trigger condition may comprise at least one of reset of a radio link failure timer, radio link failure and use of a first amount of resources.

The apparatus may be configured to perform synchronisation attempts while the apparatus is operating using the second measurement configuration.

The apparatus may be configured to operate using the first measurement configuration or a third measurement configuration after the second trigger condition is met.

In a fourth aspect there is provided a computer readable medium comprising program instructions for causing an apparatus to perform at least the following operating using a first measurement configuration, determining that a first trigger condition related to at least a radio link failure indicator is met and in response to the determining, operating using a second measurement configuration until a second trigger condition is met, wherein operating using the second measurement configuration comprises at least one of performing measurements with a decreased periodicity, an increased number of samples and/or an increased number of reports, increasing the number of measured neighbour cells and reducing a time to trigger handover period relative to the first measurement configuration.

The first measurement configuration may be a power saving measurement configuration.

The first measurement configuration and the second measurement configuration may comprise a radio resource management measurement and reporting configuration.

The radio link failure indicator may comprise at least one of a radio link failure counter, a radio link timer, determining that reference signal received power is below a first threshold, determining the failure of decoding a physical downlink control channel or physical downlink shared channel, performing new cell discovery and determining the disappearance of a known cell.

The apparatus may be caused to perform operating using the second measurement configuration after a first counter value is met or after expiry of a timer following determining that the first trigger condition is met.

The second trigger condition may comprise at least one of reset of a radio link failure timer, radio link failure and use of a first amount of resources.

The apparatus may be caused to perform performing synchronisation attempts while the apparatus is operating using the second measurement configuration.

The apparatus may be caused to perform operating using the first measurement configuration or a third measurement configuration after the second trigger condition is met.

In a fifth aspect there is provided a non-transitory computer readable medium comprising program instructions for causing an apparatus to perform at least the method according to the fourth aspect.

In the above statements, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
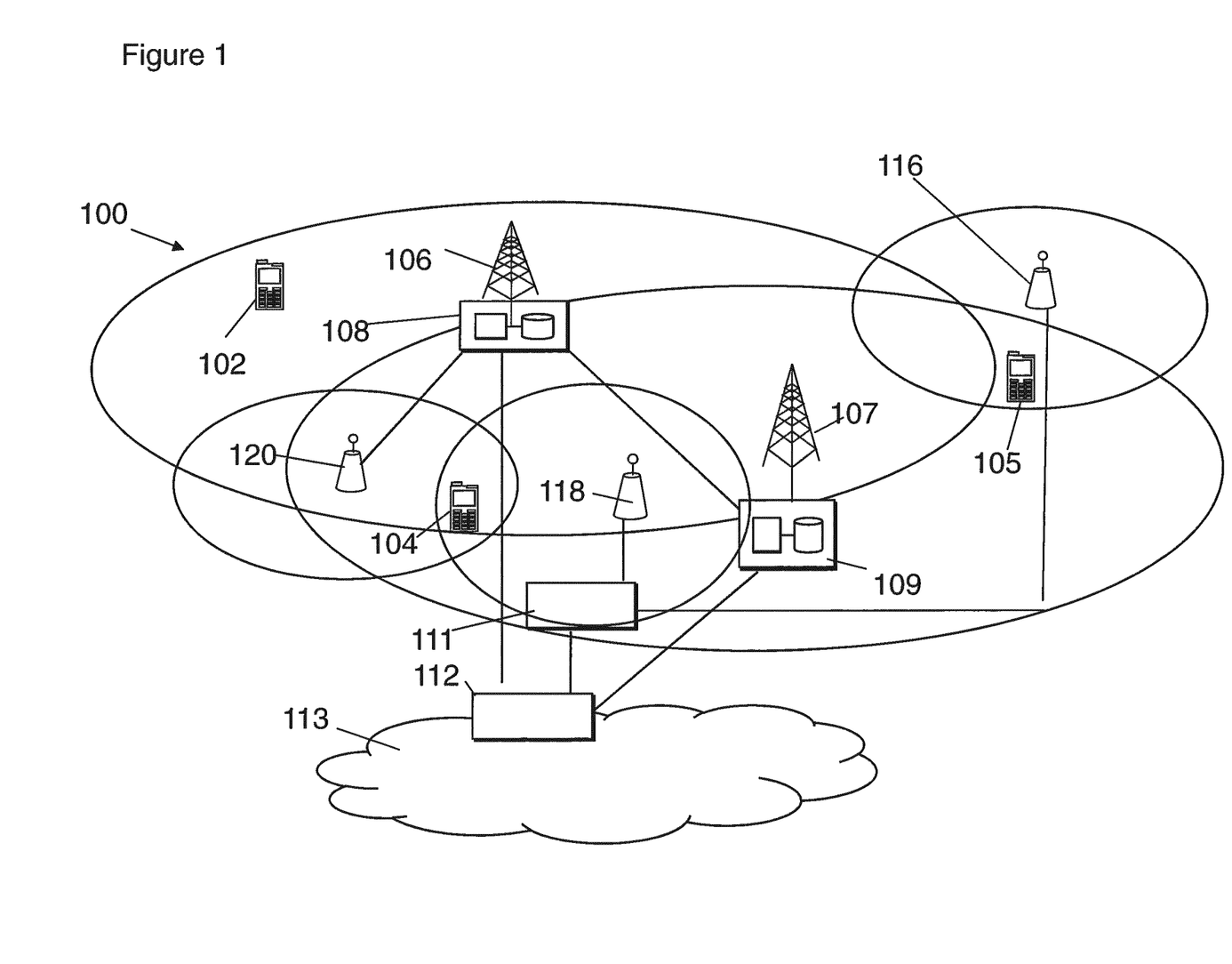
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. New functions are defined in the 5G system architecture, including an Access Management Function (AMF), Session Management Function (SMF), User Plane Function (UPF), among other network functions in the Next Generation Core (NGC). The 5G System supports new capabilities, including network slicing which may better tailor networks to application requirements and provide virtual networks for tenants. It also uses a services-based architecture the provides greater flexibility for introducing new services and features compared to the EPC which relied on fixed, peer-peer reference points. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates. MR may also support lower latency for air-interface transmission due to revisions in physical and MAC layer protocols.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, by a Centralized Unit (CU) at least partly, in a server, host or node operationally coupled to Distributed Unit (DU), which may connect to a remote radio head (RRH). It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) which may be a PSA (PDU Session Anchor) providing an anchor point for user IP, Ethernet or Unstructured user data sessions. The UPF may be responsible for forwarding frames back and forth between the DN (data network) and the gNBs through tunnels established over transport networks towards the UE(s) that want to exchange traffic with the DN.

The UPF is controlled by an SMF (Session Management Function) that receives policies from a PCF (Policy Control Function). The CN may also include an AMF (Access & Mobility Function) which terminates the control plane interface with the RAN and manages UE registrations and mobility.

Figure 2:
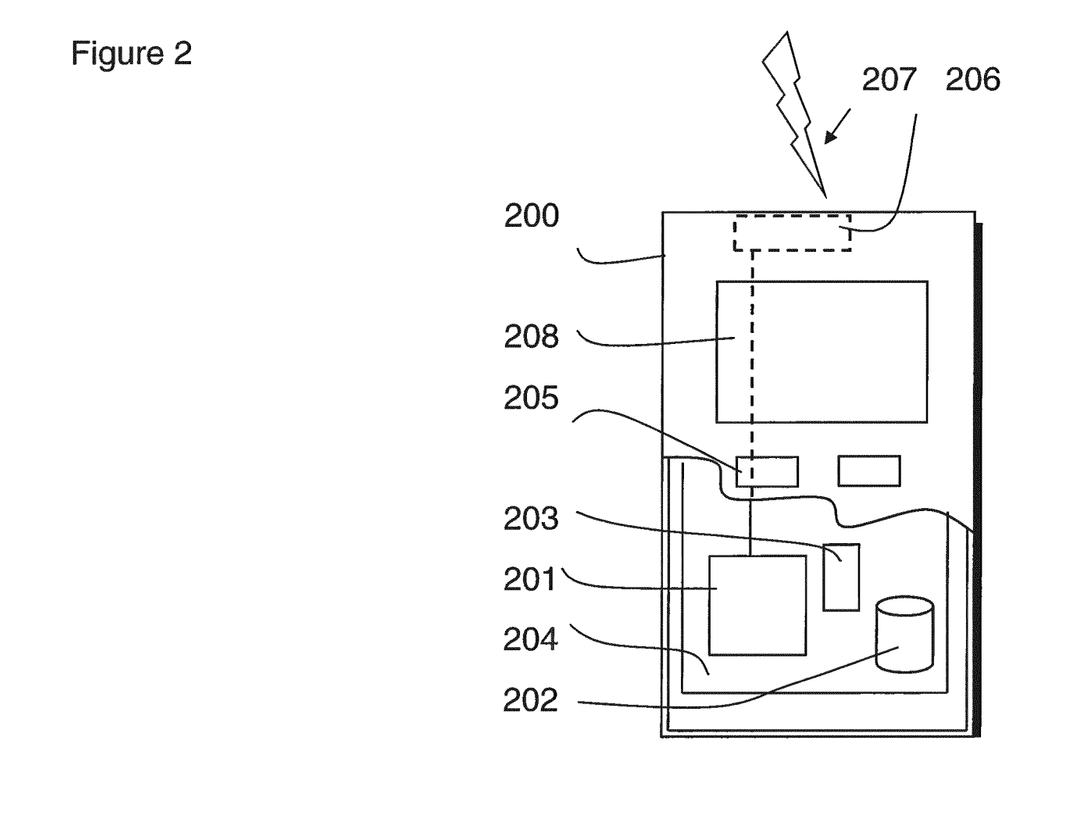
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g. a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
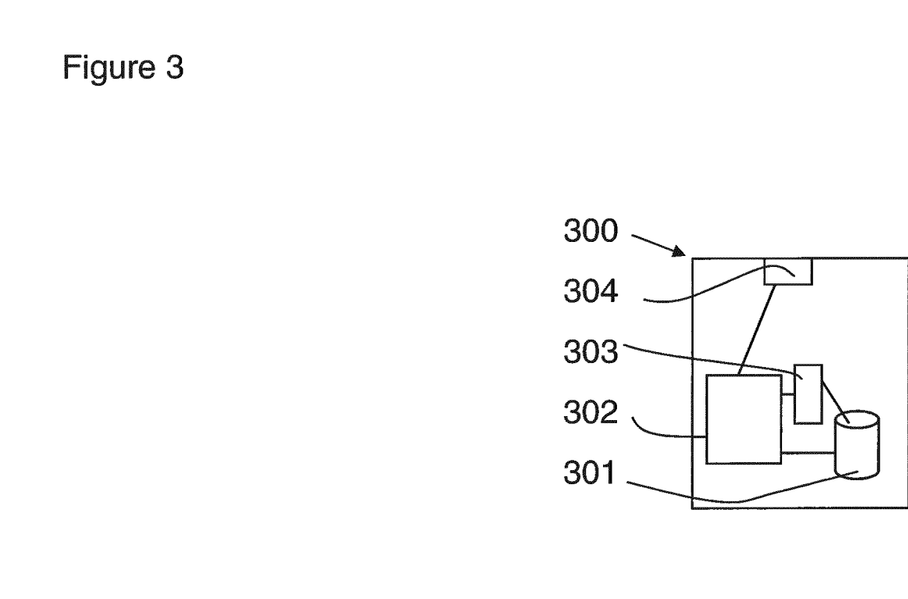
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus, such as a CU Control Plane (CU-CP) as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

RRM measurements are used to constantly evaluate the quality of the UE connection and report the results to the NW when specific change(s) in signal condition is observed. The NW makes sure the UE is connected to the best base station, measured e.g., by signal level and quality, by evaluating measurement reports and requesting a hand-over to new cells if measurements show better coverage from other cells visible to the UE.

Measurement activities are divided in measurements on reference signal(s), filtering in two levels, at physical layer (L1 filtering) and then RRC level (L3 filtering), and finally measurement reporting. The measurement, corresponding processing (filtering), and reporting consumes significant UE power which may be unnecessary in good radio conditions. For UEs in low NW traffic areas with low/no interference, in low/semi static (low mobility) condition, i.e., with low time & frequency channel variation, may have the benefit of adapting measurements for lower power consumption with negligible impact in performance.

This following is described in the context of the 5G communication systems, and relates to the study item RP-181463 "Study on UE Power Saving in NR".

It has been agreed that a UE may utilize different power saving schemes as specified in 3GPP TR 38.840. A power saving scheme "power consumption reduction in RRM measurements", is described in TR 38.840 section 5.3, where, if certain conditions (e.g., low mobility deployment, low UE speed, and/or favourable RSRP conditions) are fulfilled, RRM measurements are adapted to more relaxed requirements. The requirements which may be adapted include the measurement period, no. of samples within a measurement period, and the measurement report period. Although the TR defines other power saving schemes, the following is described with reference to the measurement adaptation of measurement requirements. Throughout this application, the term "Power Saving mode" (PS-mode) is used when referring to the relaxation of RRM measurements (or other measurements) under certain conditions.

Relaxation for intra frequency and/or inter frequency measurements in good conditions may include increasing the measurement period. Alternatively, or in addition, the number of samples (e.g., OFDM symbols/slots) within a measurement period (e.g., SMTC window) may be reduced. Alternatively, or in addition, RRM measurements may be confined within a measurement window and the periodicity of the measurement window increased for intra frequency and/or inter frequency measurement.

To achieve UE power saving, the number of cells for intra-frequency and inter-frequency measurement may be reduced, assuming a UE can limit the processing for measurement within a constrained time period and/or with reduced complexity and assuming the number of neighbouring cells to be measured is reduced. Alternatively, or in addition, the need for neighbour cell intra-frequency and inter-frequency measurement may be reduced.

Figure 4:
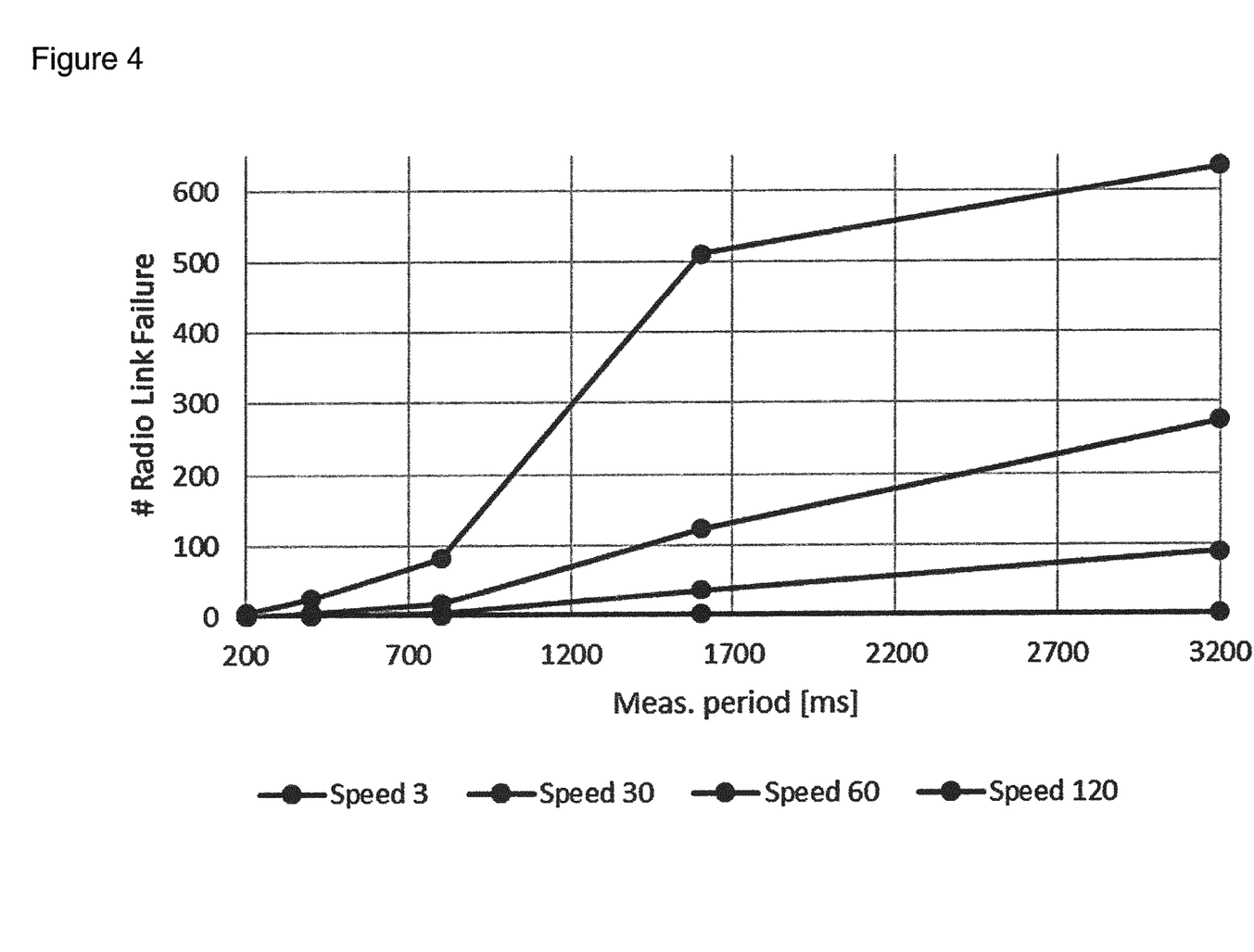
FIG. 4 shows a graph illustrating the number of radio link failures (RLF) as a function of the measurement period for UEs moving at different speeds.

However, a reduction in RRM measurements may cause degraded quality of service and user experience due to degraded mobility performance leading to Radio Link Failure (RLF) and need of RRC connection reestablishment. FIG. 4 shows the result of a system simulation performed in a dense urban area with 7 sites (3 cells per site, hexagonal grid) with one frequency layer and 50% background interference. In this simulations, a UE measures 5 samples during a measurement period and the measurement period is varied from 200 ms up to 3200 ms. UE speeds of 3 km/h, 30 km/h, 60 km/h and 120 km/h (corresponding to the lines on the graph in ascending order) and A3-event Time to trigger value of 320 ms was used. The impact of increasing measurement period is measured in terms of no. of Radio Link Failures within 40 seconds as shown in FIG. 4. As seen from the Figure a longer measurement period has a non-negligible impact on mobility performance, measured as the number of RLF, if the UE is moving and especially at higher UE speeds.

Figure 5:
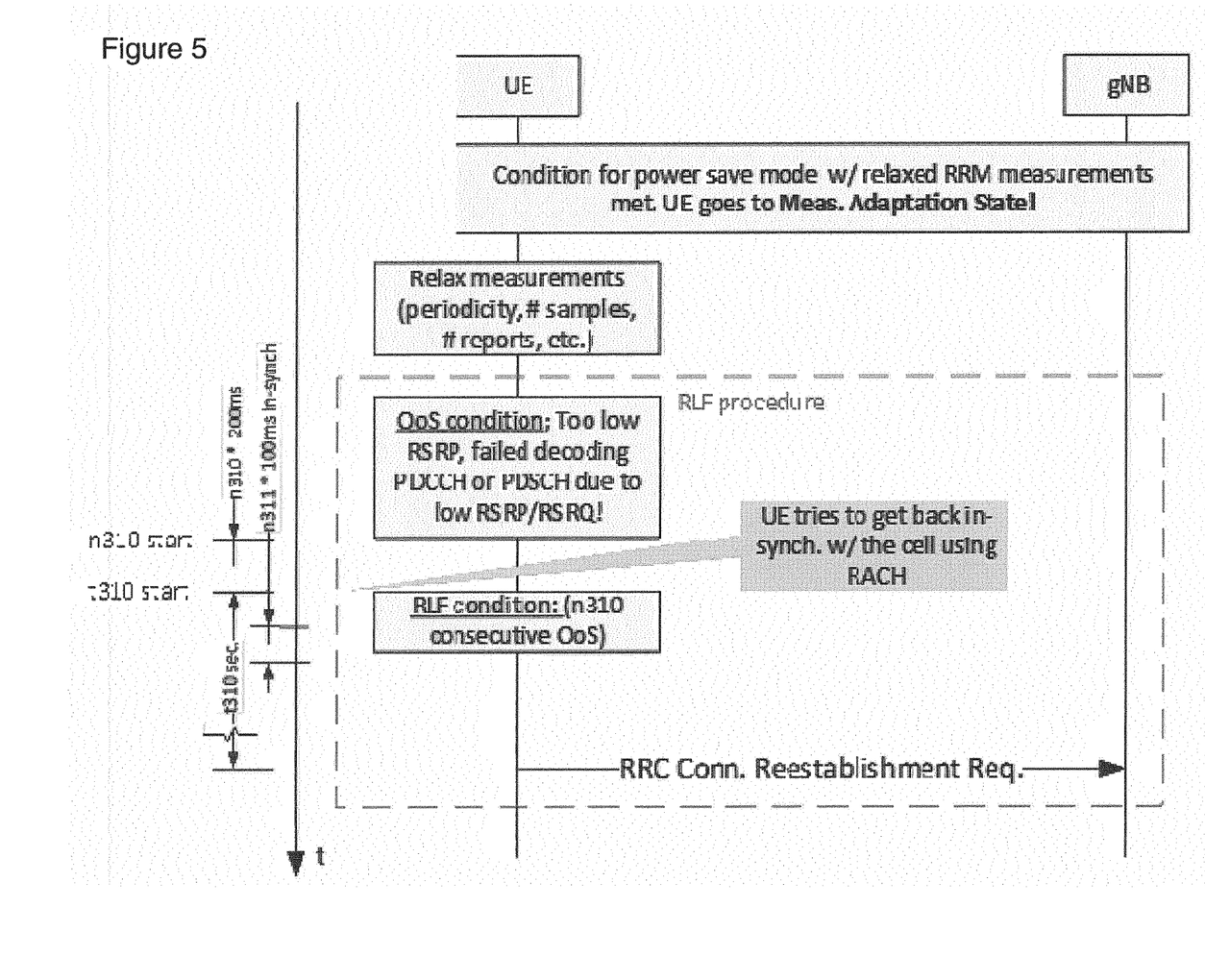
FIG. 5 shows a signaling flow for a RLF procedure.

The current procedure for Radio Link Failure assessment/declaration is depicted in FIG. 5. Whenever a UE fails to decode PDCCH or PDSCH (control and data channels) due to low RSRP/RSRQ, the UE indicates out-of-sync (OoS) to its higher layer and starts counting the number of events related to this in the n310 counter. If the UE detects n310 consecutive OoS indications for a configurable number of frames (e.g. 20 frames (200 ms)), it starts the t310 timer while trying to get back in synchronization with the network. If the t310 timer expires, the radio link is declared as failed and the UE requests RRC connection reestablishment. If the UE detects n311 consecutive in-sync indications for another configurable number of frames (e.g. 10 frames (100 ms)), prior to the t310 timer expiring, then the timer is stopped, and the link has not failed.

The timer and constants t310, n310, and n311 are configured in rlf-TimersAndConstants and may have the below values:

t310 ENUMERATED {ms0, ms50, ms100, ms200, ms500, ms1000, ms2000, ms4000, ms6000},
n310 ENUMERATED {n1, n2, n3, n4, n6, n8, n10, n20},
n311 ENUMERATED {n1, n2, n3, n4, n5, n6, n8, n10},

The procedure described with reference to FIG. 5 is independent of whether the UE is in PS-mode or not and there is no measure to prevent or limit the higher occurrence of RLF due to adaptation of measurements. The degraded QoS caused by relaxed measurement requirements is significant and may only be avoided by keeping the relaxation to a moderate level (or acceptance of the performance degradation). Hence, by introducing the power saving approach either a mobility performance degradation is caused or the potential power saving gain is limited by using a very moderate adaptation of measurement to avoid an increase in RLF failure.

That is, adaptation of the measurements increase the periodicity of measurements and/or reduce the no. of samples and/or no. of reports generated by these measurements. Due to the introduced delay in the measurement, its quality, or missing in-time report, at a higher UE speed, the RLF may happen even before an A3 event is triggered. Hence, an increase in RLF may be observed.

Figure 6:
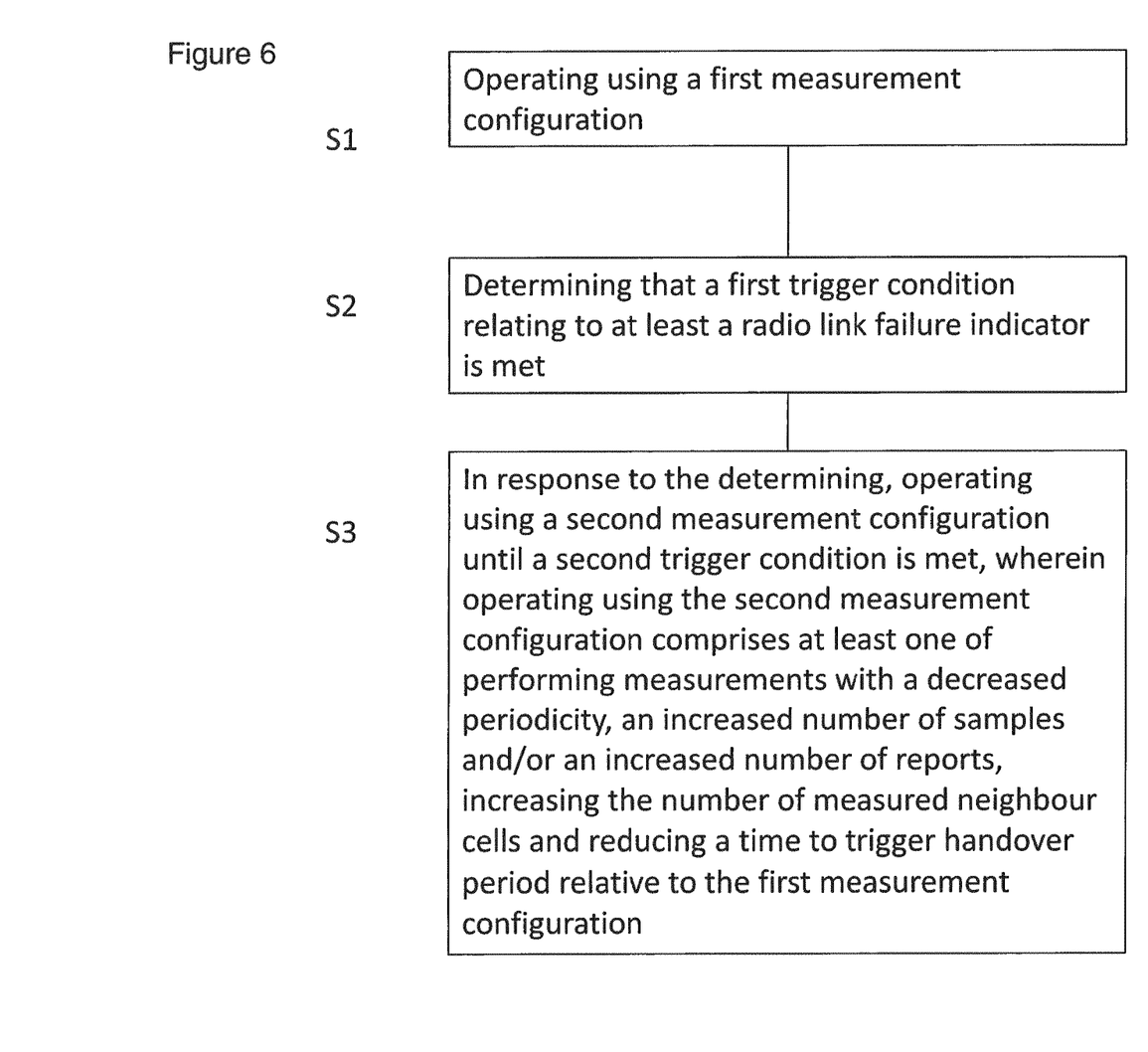
FIG. 6 shows a flowchart of a method according to an example embodiment.

A flowchart of a method according to an example embodiment is shown in FIG. 6.

In a first step, the method comprises operating using a first measurement configuration.

In a second step, the method comprises determining that a first trigger condition related to at least a radio link failure indicator is met.

In a third step, the method comprises, in response to the determining, operating using a second measurement configuration until a second trigger condition is met, wherein operating using the second measurement configuration comprises at least one of performing measurements with a decreased periodicity, an increased number of samples and/or an increased number of reports, increasing the number of measured neighbour cells or reducing a time to trigger handover period relative to the first measurement configuration.

The first and/or second measurement configuration may be an RRM measurement and reporting configuration. The configuration may be configured by the network or internally configured in the UE (i.e. independent of the network).

In one example embodiment, in the second measurement configuration one or more measurement or mobility parameters may be scaled as described below.

The measurement distance may be decreased relative to the value in the first measurement configuration mode (e.g. to 40 ms). This parameter can potentially be scaled with the UE's speed as low distance in measurements for stationary (e.g., 0 km/h) and pedestrian (e.g., 3 km/h) UEs can have negative impact. On the other hand, for UEs in moderate or high speed the channel condition is changing fast, hence, short distance will improve the UEs ability to capture the changes.

The maximum number of samples may be applied. Measurement accuracy may improve with increased no. of samples.

The maximum number of measurement reports may be applied. If any reporting is skipped for power saving in the first measurement configuration, the UE may have missed informing the NW to trigger A3 due to missing knowledge of the most recent channel changes.

The A3 Time To Trigger (TTT) may be reduced. A fast reaction to A3 trigger for HO to a better cell may avoid a UE staying in cell with bad conditions for too long.

The UE may sweep over antenna ports/configurations and adapt.

The first measurement configuration may be a power saving mode having a relaxed/adapted measurement configuration as described above. The adapted/relaxed measurement configuration based on the corresponding UE power saving scheme is referred to as "Measurement Adaptation State".

Alternatively, the first measurement configuration may be a "Measurement Normal State", e.g., the Release 15 measurement configuration as described above.

The second measurement configuration may be referred to as a "Measurement Recovery State". The recovery state is a measurement state where the UE performs more aggressive measurements to validate the condition. By having this recovery state, the UE may be able to compensate for a lack of measurements in one of the other states.

Figure 7:
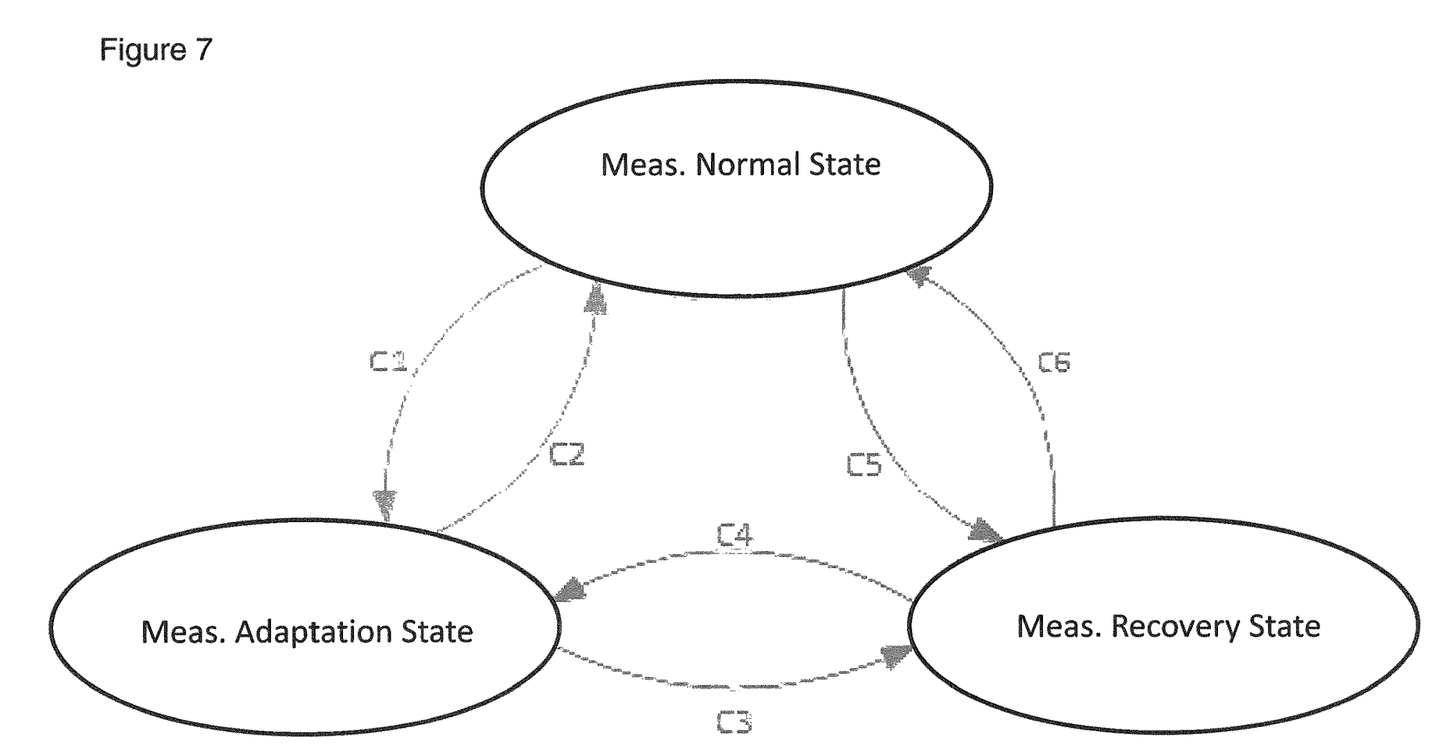
FIG. 7 shows a schematic diagram of transitions between Measurement States.

The three measurement states and transitions in between are illustrated in FIG. 7. The entry and exit criteria for the UE to move to Adaptation State and back to Normal State, C1 and C2, are being defined. The trigger conditions for a UE to move between the "Measurement Adaptation State" and the "Measurement Recovery State" are C3 and C4. The trigger conditions for a UE to move between the "Measurement Normal State" and the "Measurement Recovery State" are C5 and C6.

The first trigger condition related to at least a RLF indicator may comprise an indication of an upcoming RLF such as an RLF counter n310 (potentially a newly defined n310 when the UE is in PS-mode (PS_n310) where PS_310 is lower than n310 to help a faster recovery) or an RLF timer, t310, or at least one of determining that reference signal received power is below a first threshold, determining the failure of decoding a physical downlink control channel or physical downlink shared channel, performing new cell discovery and determining the disappearance of a known cell.

The indicator to predict the upcoming failure is the same as the ones used for RLF procedure itself, i.e., missing decoding of PDCCH or PDSCH due to too low RSRP. Alternatively, or in addition, there may be other points or triggers for the UE to operate using the second measurement configuration, such as variations in measurements beyond certain thresholds (indicating an instable radio channel), new cells being discovered (where it is beneficial to have detailed information available fast), where strong cells are disappearing (for cases where the channel is not guaranteed, such as NR operation in the unlicensed band, NR-U), etc.

The NW may define a new counter value, PS_n310<=n310 (NW assisted), or the UE may autonomously determine to use the second measurement configuration.

The method may comprise operating using the second set of measurement parameters after a first counter value is met or after expiry of a timer following determining that the first trigger condition is met. For example, the NW may configure a timer t310 for Measurement Adaptation State (PS_n310).

Alternatively, or in addition, the UE may make its own decision after n310 counter is started.

The idea is for UE to start Recovery State in time to be able to recover from OoS, hence, no later than start of t310 timer.

Depending on when the UE begins operating using the second measurement configuration, the UE has min t310 seconds to get back in-synch with the NW and help cancelling t310 before it is expired and RLF declared. The method may comprise performing synchronisation attempts while the apparatus is operating using the second measurement configuration. That is, the Measurement Recovery State runs in parallel with the triggered activities from UE in relation to RLF procedure.

The second trigger condition may comprise at least one of reset of a radio link failure timer, radio link failure and use of a first amount of resources.

For example, when a UE has spent a given amount of resources in the Measurement Recovery State, the UE may transition to one of the two other states. The first amount of resources spent in the Measurement Recovery State may be defined as an amount of measurements, a specific time, or defined by other means.

The transitions out of Measurement Recover state are marked with C4 and C6 in FIG. 7 for transition to Adaptation State and Normal State, respectively. The conditions for exiting Recovery state may be based on either defined number of In-synch condition or other means for determining whether the radio conditions require RLF to be declared or not.

The user equipment may operate using the first measurement configuration or a third measurement configuration after the second trigger condition is met. That is, the UE may return to the Measurement Adaption State or the Measurement Normal State it was operating in before the Measurement Recovery State or it may return to the other one of these states.

Figure 8:
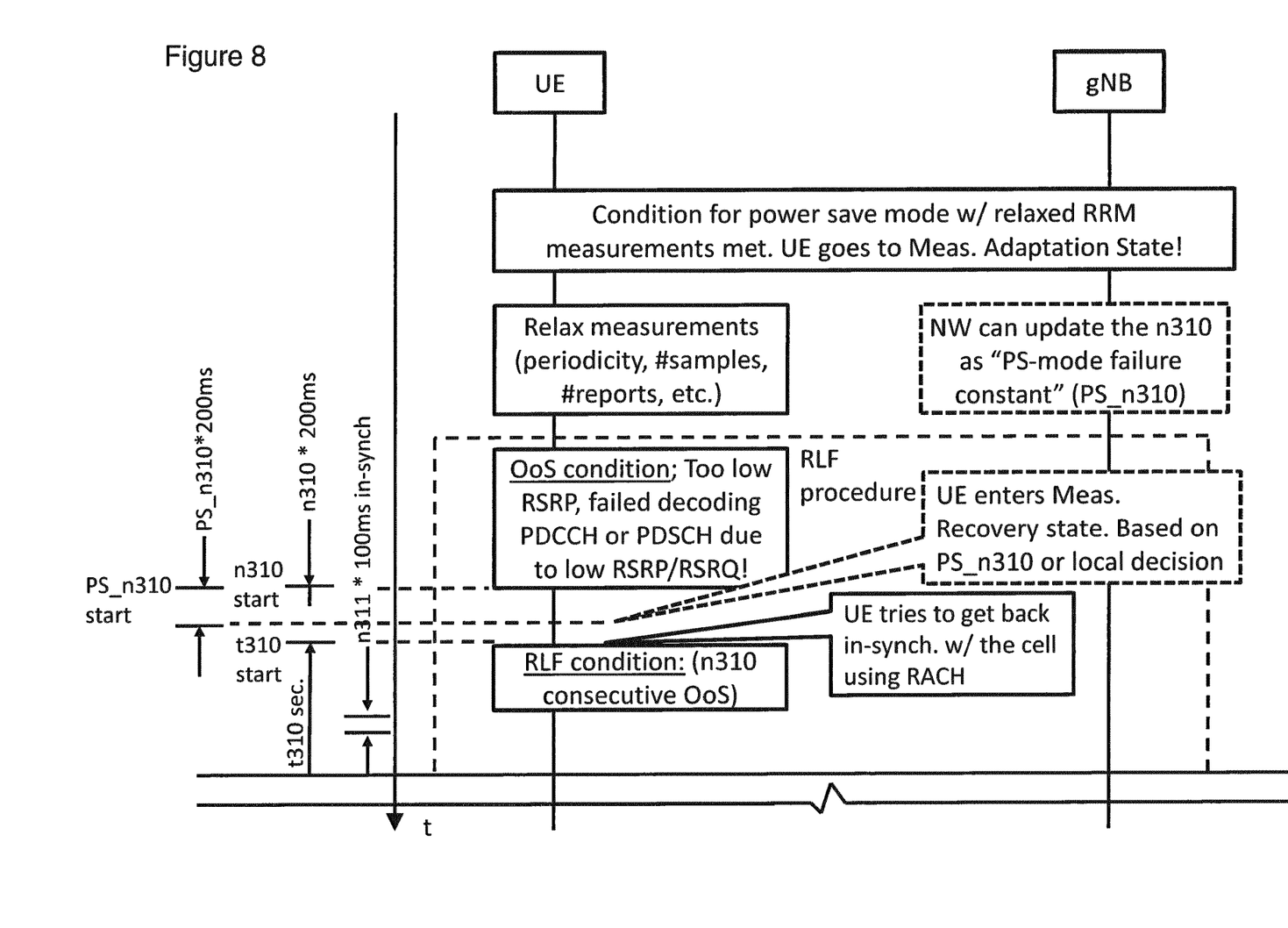
FIG. 8 shows a signaling flow for a RLF procedure according to an example embodiment.

FIG. 8 illustrates a UE moving to Measurement Recovery State when a first trigger condition is met. The NW updates the n310 as "PS-mode failure constant (PS_n310). On detection of an OoS condition and based on PS_n310 or a local decision enters the Measurement Recovery State. t310 starts after n310 and the UE attempts to get back in synchronisation with the cell using RACH.

Figure 9:
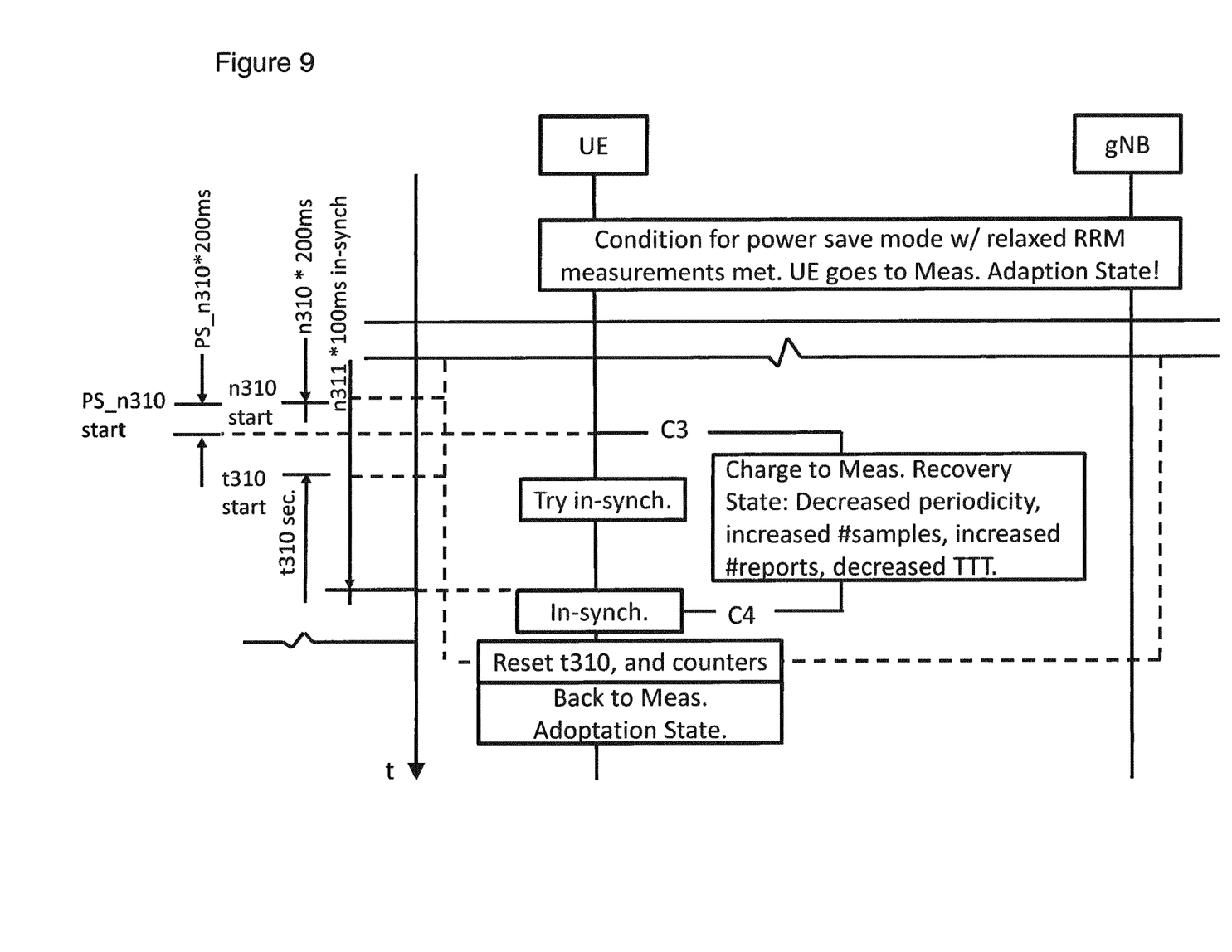
FIG. 9 shows a signaling flow for a RLF procedure according to an example embodiment.

FIG. 9 illustrates a UE moving to a Measurement Recovery State as in FIG. 8. In this Figure, the UE, in the Measurement Recovery State is able to get back in synch with the NW, before expiry of t310. t310 is reset and the UE returns to the Measurement Adaptation State.

Each of the scaled parameters may improve the UE's ability to capture conditions for its serving cell compared to its neighbour cells and/or be able to let NW trigger A3 and react more quickly than in the Measurement Adaptation state. The idea is that UE should be very aggressive to be able to prevent RLF before t310 is expired.

FIG. 9 illustrates a UE moving to a Measurement Recovery State as in FIG. 8. In this Figure, the UE, in the Measurement Recovery State is able to get back in synch with the NW, before expiry of t310. t310 is reset and the UE returns to the Measurement Adaptation State.

During the Measurement Recovery state the UE power consumption may increase but the increase is expected to be negligible compared to the power saving achieved with a more aggressive relaxation in the Measurement Adaptation State.

The Measurement Recovery State should be seen as an intermediate state where the UE is performing extraordinary measurements to allow for increased accuracy or increased information to recover from lack of available measurements in the past. As shown in FIG. 3, the transitions out of this state are marked with C4 and C6 for transition to Adaptation State and Normal State, respectively. The conditions for exiting Recovery state could be based on either defined number of In-synch condition (as illustrated in FIG. 9) or other means for determining whether the radio conditions require RLF to be declared or not.

A method as described above addresses degraded mobility performance which may result from UE power saving based on adaptation of UE measurements and proposes a solution with early detection of the upcoming degradation and a counter measure to reduce or completely prevent the negative impact. The method may be applicable in any other cases where significant change in the channel is observed, without a UE being in PS-mode. The proposed Recovery mode (i.e., the second measurement configuration) attempts to compensate for the measurement configuration using the more aggressive measurements and/or general scaling of mobility parameters, compared to the first measurement configuration, before RLF occurs or is declared.

The second measurement configuration scales measurement and/or other mobility parameters to introduce a fast recovery mechanism before RLF is declared or avoided. The second measurement configuration may compensate for reduced measurement accuracy, which may lead to higher number of Radio Link Failure as the result of relaxation in measurement requirements in, for example, a first measurement configuration comprising a Measurement Adaptation state.

Although in the above, the Recovery State is described mainly as compensating for any negative mobility impact caused by the Measurement Adaptation State, the Measurement Recovery State may also be used as a counter measure for degradation seen in Measurement Normal State when fast time & frequency channel variation is observed.

The method may be implemented in a user equipment as described with reference to FIG. 2 or a control apparatus as described with reference to FIG. 3.

An apparatus may comprise means for operating using a first measurement configuration, determining that a first trigger condition related to at least a radio link failure indicator is met and in response to the determining, operating using a second measurement configuration until a second trigger condition is met, wherein operating using the second measurement configuration comprises at least one of performing measurements with a decreased periodicity, an increased number of samples and/or an increased number of reports, increasing the number of measured neighbour cells and reducing a time to trigger handover period relative to the first measurement configuration.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G NR, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising:
at least one processor and at least one memory including a computer program code, the at least one memory and computer program code configured to, with the at least one processor, cause the apparatus at least to perform:
operating using a first or a second measurement configuration, wherein operating using the first or second measurement configuration comprises performing measurements with an increased periodicity of measurements, a reduced number of samples, and a number of reports generated by these measurements relative to the first and second measurement configurations;
determining that a first trigger condition related to at least a radio link failure indicator is met;
in response to the determining, operating using a third measurement configuration until a second trigger condition is met, wherein operating using the third measurement configuration comprises at least one of performing measurements with a decreased periodicity, an increased number of samples and/or an increased number of reports, increasing the number of measured neighbour cells and reducing a time to trigger handover period relative to the first and third measurement configurations; and using the first or second measurement configurations after the second trigger condition is met.

2. An apparatus according to claim 1, wherein the first measurement configuration is a power saving measurement configuration.

3. An apparatus according to claim 1, wherein the first measurement configuration and the second measurement configuration comprise a radio resource management measurement and reporting configuration.

4. An apparatus according to claim 1, wherein the radio link failure indicator comprises:
a radio link failure counter;
a radio link timer;
determining that reference signal received power is below a first threshold;
determining the failure of decoding a physical downlink control channel or physical downlink shared channel;
performing new cell discovery; and
determining the disappearance of a known cell.

5. An apparatus according to claim 1, the at least one memory and computer program code configured to, with the at least one processor, cause the apparatus at least to perform operating using the second measurement configuration after a first counter value is met or after expiry of a timer following determining that the first trigger condition is met.

6. An apparatus according to claim 1, wherein the second trigger condition comprises at least one of reset of a radio link failure timer, radio link failure and use of a first amount of resources.

7. An apparatus according to claim 1, the at least one memory and computer program code configured to, with the at least one processor, cause the apparatus at least to perform synchronisation attempts while the apparatus is operating using the second measurement configuration.

8. A method comprising:
operating using a first or a third second measurement configuration, wherein operating using the first or second measurement configuration comprises performing measurements with an increased periodicity of measurements, a reduced number of samples, and a number of reports generated by these measurements relative to the first and second measurement configurations;
determining that a first trigger condition related to at least a radio link failure indicator is met;
in response to the determining, operating using a third measurement configuration until a second trigger condition is met, wherein operating using the third measurement configuration comprises at least one of performing measurements with a decreased periodicity, an increased number of samples and/or an increased number of reports, increasing the number of measured neighbour cells and reducing a time to trigger handover period relative to the first and third measurement configurations; and
using the first or third second measurement configurations after the second trigger condition is met.

9. A non-transitory computer readable medium comprising program instructions stored thereon for performing at least the following:
operating using a first or a second measurement configuration, wherein operating using the first or second measurement configuration comprises performing measurements with an increased periodicity of measurements, a reduced number of samples, and a number of reports generated by these measurements relative to the first and second measurement configurations;
determining that a first trigger condition related to at least a radio link failure indicator is met; and
in response to the determining, operating using a third measurement configuration until a second trigger condition is met, wherein operating using the third measurement configuration comprises at least one of performing measurements with a decreased periodicity, an increased number of samples and/or an increased number of reports, increasing the number of measured neighbour cells and reducing a time to trigger handover period relative to the first and third measurement configurations; and
using the first or third second measurement configurations after the second trigger condition is met.

* * * * *